United States Patent
Khan et al.

(10) Patent No.: US 6,400,954 B1
(45) Date of Patent: Jun. 4, 2002

(54) METHODS AND SYSTEMS FOR MODE SELECTION BASED ON ACCESS NETWORK CAPACITY

(75) Inventors: Farooq Khan, Kista; Dalibor Turina, Täby; Magnus Frodigh, Sollentuna, all of (SE)

(73) Assignee: Tlelefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/079,231

(22) Filed: May 15, 1998

(51) Int. Cl.[7] .................................................. H04Q 7/20
(52) U.S. Cl. ...................... 455/450; 455/452; 455/453
(58) Field of Search ............................... 435/436, 438, 435/443, 444, 445, 449, 450, 452, 453, 464, 466, 509, 507; 370/207, 223, 294, 337, 329, 332, 252, 536, 266; 379/221

(56) References Cited

U.S. PATENT DOCUMENTS

| | | | |
|---|---|---|---|
| 4,670,899 A | * 6/1987 | Brody et al. ................ | 455/453 |
| 4,731,816 A | * 3/1988 | Hughes-Hartogs .......... | 370/207 |
| 5,497,504 A | 3/1996 | Acampora et al. .......... | 455/33.2 |
| 5,633,859 A | * 5/1997 | Jain et al. .................... | 370/234 |
| 5,652,751 A | * 7/1997 | Sharony ....................... | 379/221 |
| 5,701,295 A | * 12/1997 | Bales et al. .................. | 455/468 |
| 5,729,531 A | * 3/1998 | Raith et al. .................. | 455/453 |
| 5,754,959 A | * 5/1998 | Ueno et al. ................... | 455/453 |
| 5,794,140 A | * 8/1998 | Sawyer ........................ | 455/453 |
| 5,796,722 A | * 8/1998 | Kotzin et al. ................ | 455/453 |
| 5,805,301 A | * 9/1998 | Rasanen ...................... | 455/450 |
| 5,812,534 A | * 9/1998 | Davis et al. ................. | 370/260 |
| 5,903,843 A | * 5/1999 | Suzuki et al. ................ | 455/453 |
| 5,940,763 A | * 8/1999 | Alperovich et al. ........ | 455/450 |
| 6,002,676 A | * 12/1999 | Fleming ....................... | 370/328 |
| 6,005,852 A | * 12/1999 | Kokko et al. ................ | 370/329 |

FOREIGN PATENT DOCUMENTS

| | | |
|---|---|---|
| EP | 701382 | 3/1996 |
| EP | 719062 | 6/1996 |
| GB | 2313254 | 11/1997 |
| WO | WO95/07578 | 3/1995 |
| WO | WO96/37081 | 11/1996 |
| WO | WO97/12490 | 4/1997 |

OTHER PUBLICATIONS

European Search Report re RS 101117 Date of mailing of search: Jan. 27, 1999.

* cited by examiner

Primary Examiner—Nay Maung
Assistant Examiner—Jean A Gelin
(74) Attorney, Agent, or Firm—Burns, Doane, Swecker & Mathis, L.L.P.

(57) ABSTRACT

A radiocommunication system supports high throughput rates over an air interface. An access network interface, e.g., between a base station and base station controller, conveys information between the base station and the rest of the terrestrial system. Techniques are provided to adjust transmission rates over the air interface based on loading of the access network. Techniques are also provided to control bandwidth allocation over the access network interface and distribute call blocking/delay percentages when there is an imbalance between the capacity of the air interface and the access network interface.

19 Claims, 5 Drawing Sheets

BSC=Base Station Controller
GMSC=Gateway Mobile Switching Centre
VLR=Visitor Location Register
HLR=Home Location Register
SGSN=Serving GPRS Support Node
GGSN=Gateway GPRS Support Node

| Service name | Code Rate | Radio Interface Rate | Number of BW units (16 kbps), $b_i$ |
|---|---|---|---|
| GPRS CS-1 | 1/2 | 11.2 kbps | 1 (16 Kbit/s) |
| GPRS CS-2 | 2/3 | 14.5 kbps | 1 (16 Kbit/s) |
| GPRS CS-3 | 3/4 | 16.7 kbps | 2 (32 Kbit/s) |
| GPRS CS-4 | 1 | 22.8 kbps | 2 (32 Kbit/s) |
| EGPRS ECS-1 | 1/2 | 33.0 kbps | 3 (48 Kbit/s) |
| EGPRS ECS-2 | 2/3 | 41.0 kbps | 3 (48 Kbit/s) |
| EGPRS ECS-3 | 3/4 | 48.0 kbps | 4 (64 Kbit/s) |
| EGPRS ECS-4 | 1 | 65.2 kbps | 4* (64 Kbit/s) |

FIG. 1

METHODS AND SYSTEMS FOR MODE SELECTION BASED ON ACCESS NETWORK CAPACITY

BACKGROUND

The present invention generally relates to increasing data throughput and quality in a wireless communication system and, more particularly, to systems and methods involving selection of air interface transmission modes based on access network capacity in radiocommunication systems.

The growth of commercial communication systems and, in particular, the explosive growth of cellular radiotelephone systems have compelled system designers to search for ways to increase system capacity without reducing communication quality beyond consumer tolerance thresholds. At the same time usage of mobile communication equipment for transmission of data rather than speech has become increasingly popular by consumers. The ability to send and receive electronic mail and to use a web browser to obtain world-wide-web access is frequently discussed among services that will be used more and more in wireless communication systems. In response to this, communication system designers search for ways to efficiently transfer data information to and from mobile users and, in particular, to provide high data rate transfer capability.

In considering various technologies for next generation, high data rate radiocommunication systems, both time division multiple access (TDMA) and code division multiple access (CDMA) technologies are potential candidates in various parts of the world. In TDMA, radio channels are created by dividing frequencies into a number of time slots and associating a given number of time slots with each channel. Capacity can be increased, e.g., to provide higher data rates, by increasing the number of time slots associated thereiwith.

In a typical CDMA system, an information data stream to be transmitted is impressed upon a much higher bit rate data stream produced by a pseudorandom code generator. The information signal and the pseudorandom signal are typically combined by multiplication in a process sometimes called coding or spreading the information signal. Each information signal is allocated a unique spreading code. A plurality of coded information signals are transmitted as modulations of radio frequency carrier waves and are jointly received as a composite signal at a receiver. Each of the coded signals overlap all of the other coded signals, as well as noise-related signals, in both frequency and time. By correlating the composite signal with one of the unique spreading codes, the corresponding information signal can be isolated and decoded.

In addition to selecting an access methodology, next generation systems must also consider suitable techniques for increasing the information rates associated with conventional implementations of those techniques. For example, higher level modulations and allocation of additional timeslots per channel are being considered to increase the throughput over the air interface, i.e., the interface between mobile stations and base stations. However, in order to completely accommodate an increase in information transmission rates, the entire system, not just the air interface, must be enhanced or modified to support the desired, higher throughput rate.

For example, in the pan-European standard known as the Global System for Mobile (GSM) communications, there exists an interface between the base transceiver system (BTS) and the base station controller (BSC), which interface is commonly as referred to as the A-bis interface. The A-bis interface is specified in GSM Technical Specifications (BSC-BTS) interface, GSM 08.5 Series, the description of which is incorporated here by reference. This interface is designed to provide for a throughput (per air interface connection) of up to about 16 kbps. However, system designers now envision much higher information rates being accommodated over the air interface, i.e., on the order of 64 kbps. Accordingly, the throughput associated with this network interface, as well as other interfaces within GSM systems and those in other systems, needs to be addressed in light of the anticipated increases in capacity over the air interface.

An example of how the GSM system could be extended to provide for increased capacity is illustrated in FIG. 1. Therein, a number of different types of packet data GPRS/EGPRS services are described in terms of channel coding (i.e., convolutional coding) rate, air interface data rate and the number of terrestrial bandwidth (BW) units need to handle the corresponding air interface data rate. One relatively straight forward solution for accommodating such a change to the air interface capacity is to simply increase the throughput/capacity of the access network to match that provided for the air interface. For example, to accommodate the changes to GSM proposed in FIG. 1, the A-bis interface could be extended to provide eight PCM slots (i.e., 512 Kbps) per transmitter unit to handle the maximum throughput defined in FIG. 1 of about 64 kpbs.

However, costs associated with extending the capacity of the access network are severe. Additionally, several operators lease capacity in access networks from access network providers, e.g., other operators, and they are interested in limiting the leasing costs by an efficient usage of access network resources. Thus, it would be desirable to provide techniques and systems which are able to avoid reaching the capacity limits of the access network as a possible alternative to extending the capacity thereof.

Moreover, Applicants anticipate that, in some implementations, designers and/or network operators may opt to increase the throughput of the air interface to a point which reaches or exceeds the capacity of the access network. Accordingly, it would also be desirable to find techniques for controlling allocation of call blocking and/or packet delay which will result when the access network reaches or exceeds its capacity limits.

SUMMARY

These and other drawbacks and limitations of conventional methods and systems for communicating information are overcome according to the present invention, wherein Applicants present techniques and systems for air interface transmission mode selection, eg., selection of transmission parameters affecting the information rate such as modulation type and/or forward error correction coding type, based, least in part, on a current load experienced in the access network. For example, when a new call is being set-up, the load on the access network can be checked. If the load has reached a predetermined threshold, e.g., close to or equal to the access network capacity, then the system can free resources by reducing the information rate associated with ongoing calls. Alternatively, the system may elect to reduce the information rate permitted for the new call so that it fits within the available access network resources.

According to another exemplary embodiment, a plurality of call service classes are defined. Certain call service classes, which are less delay tolerant, can be reserved sufficient resources on the access network interface so that these connections are serviced without blocking or delay on the access network regardless of how highly loaded the air interface becomes. Other service classes, which are more delay tolerant, are reserved less resources on the access network and may experience greater delay and/or more blocking if the air interface becomes more heavily loaded. The invention is also readily applicable to access networks wherein Asynchronous Transfer Mode (ATM) techniques are utilized, ATM can be used to increase access network utilization by statistical multiplexing of different data streams.

Other system processes, e.g., cell selection and handoff, can also be performed in light of access network loading.

BRIEF DESCRIPTION OF THE DRAWINGS

These and other objects, features and advantages of the present invention will become more apparent upon reading from the following detailed description, taken in conjunction with the accompanying drawings, wherein:

FIG. 1 is a table depicting exemplary service classes in a modified GSM system;

DETAILED DESCRIPTION

The following exemplary embodiments are provided in the context of TDMA radiocommunication systems. However, those skilled in the art will appreciate that this access methodology is merely used for the purposes of illustration and that the present invention is readily applicable to all types of access methodologies including frequency division multiple access (FDMA), TDMA, code division multiple access (CDMA) and hybrids thereof.

Moreover, operation in accordance with GSM communication systems is described in European Telecommunication Standard Institute (ETSI) documents ETS 300 573, ETS 300 574 and ETS 300 578, which are hereby incorporated by reference. Therefore, the operation of an exemplary GPRS (packet data) extension to the GSM system is only described herein to the extent necessary for understanding the present invention. Although, the present invention is described in terms of exemplary embodiments in a GPRS/GSM system, those skilled in the art will appreciate that the present invention could be used in a wide variety of other communication systems, such as those based on PDC or D-AMPS standards and enhancements thereof.

An advantage of introducing a packet data protocol in cellular systems is the ability to support high data rate transmissions and at the same time achieve a flexibility and efficient utilization of the radio frequency bandwidth over the radio interface. The concept of GPRS is designed for so-called "multislot operations" where a single user is allowed to occupy more than one transmission resource simultaneously.

Figure 2:
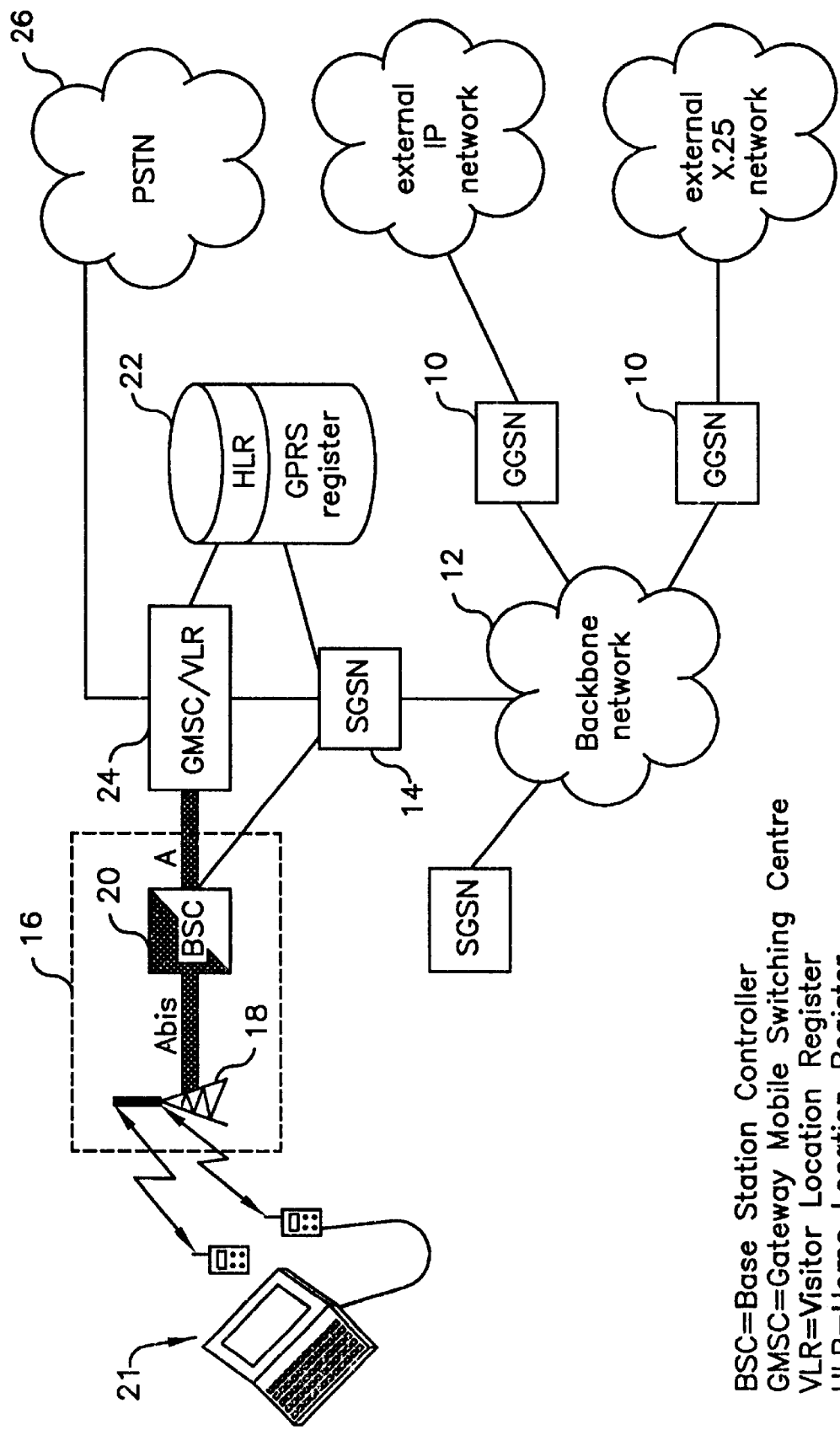
FIG. 2 is a functional block diagram of an exemplary radiocommunication system.

An overview of the GPRS network architecture is illustrated in FIG. 2. Information packets from external networks will enter the GPRS network at a GGSN (Gateway GPRS Service Node) 10. The packet is then routed from the GGSN via a backbone network, 12, to a SGSN (Serving GPRS Support Node) 14, that is serving the area in which the addressed GPRS mobile resides. From the SGSN 14 the packets are routed to the correct BSS (Base Station System) 16, in a dedicated GPRS transmission. The BSS includes a plurality of base transceiver stations (BTS), only one of which, BTS 18, is shown and a base station controller (BSC) 20. The interface between the BTSs and the BSCs are referred to as the A-bis interface. The BSC is a GSM specific denotation and for other exemplary systems the term Radio Network Control (RNC) is used for a node having similar functionality as that of a BSC. Packets are then transmitted by the BTS 18 over the air interface to a remote unit 21 using a selected information transmission rate, as will be described below.

A GPRS register will hold all GPRS subscription data. The GPRS register may, or may not, be integrated with the HLR (Home Location Register) 22 of the GSM system. Subscriber data may be interchanged between the SGSN and the MSC/VLR 24 to ensure service interaction, such as restricted roaming. The access network interface between the BSC 20 and MSC/VLR 24 is a standard interface known as the A-interface, which is based on the Mobile Application Part of CCITT Signaling System No. 7. The MSC/VLR 24 also provides access to the land-line system via PSTN 26.

For a given offered load on the radio interface, there is a corresponding network interface instantaneous load. The network interface traffic load is a function of the air interface load and the air interface transmission mode used. Whenever the instantaneous network interface load exceeds the link capacity, blocking and/or delay occur. This blocking and/or delay can be minimized by dynamically adapting the radio interface transmission mode, thus reducing the access network offered load.

According to exemplary embodiments of the present invention, when the system recognizes that the access network is becoming fully loaded or exceeds some loading threshold for a particular base station, then the system can adjust the mode with which it communicates with mobile stations over the air interface. The term "mode" as it is referred to herein refers to the various parameters which impact the information rate at which transmissions are performed including for example, modulation type and forward error correction coding. Other parameters that can affect the information rate are different puncturing schemes and, particularly, for CDMA based system, different spreading factors. For a complete discussion of link adaptation per se, the interested reader is referred to U.S. patent application Ser. No. 08/921,319, entitled "A Link Adaptation Method for Links Using Modulation Schemes That Have Different Symbol Rates", filed on Aug. 29, 1997, the disclosure of which is incorporated here by reference.

When the required access network capacity is not available, some ongoing calls may be reallocated to a lower amount of access network resources by changing their associated air interface transmission mode, e.g., by switching from a link adaptation having a higher information rate to a transmission mode having a lower information rate. In this way, additional access network capacity can be freed for new calls to be established. The amount of capacity released from the ongoing call(s) and thus allocated to the new call(s) will depend, for example, upon the relative priorities of the ongoing call(s) and the new call(s). To determine which ongoing calls should have their air interface transmission mode modified to provide additional access network capacity, various techniques can be used. For example, the ongoing calls can be evaluated to identify calls having degraded channel quality that are on the verge of switching to a transmission mode having a lower information rate. Alternatively, a random selection can be made.

Figure 3:
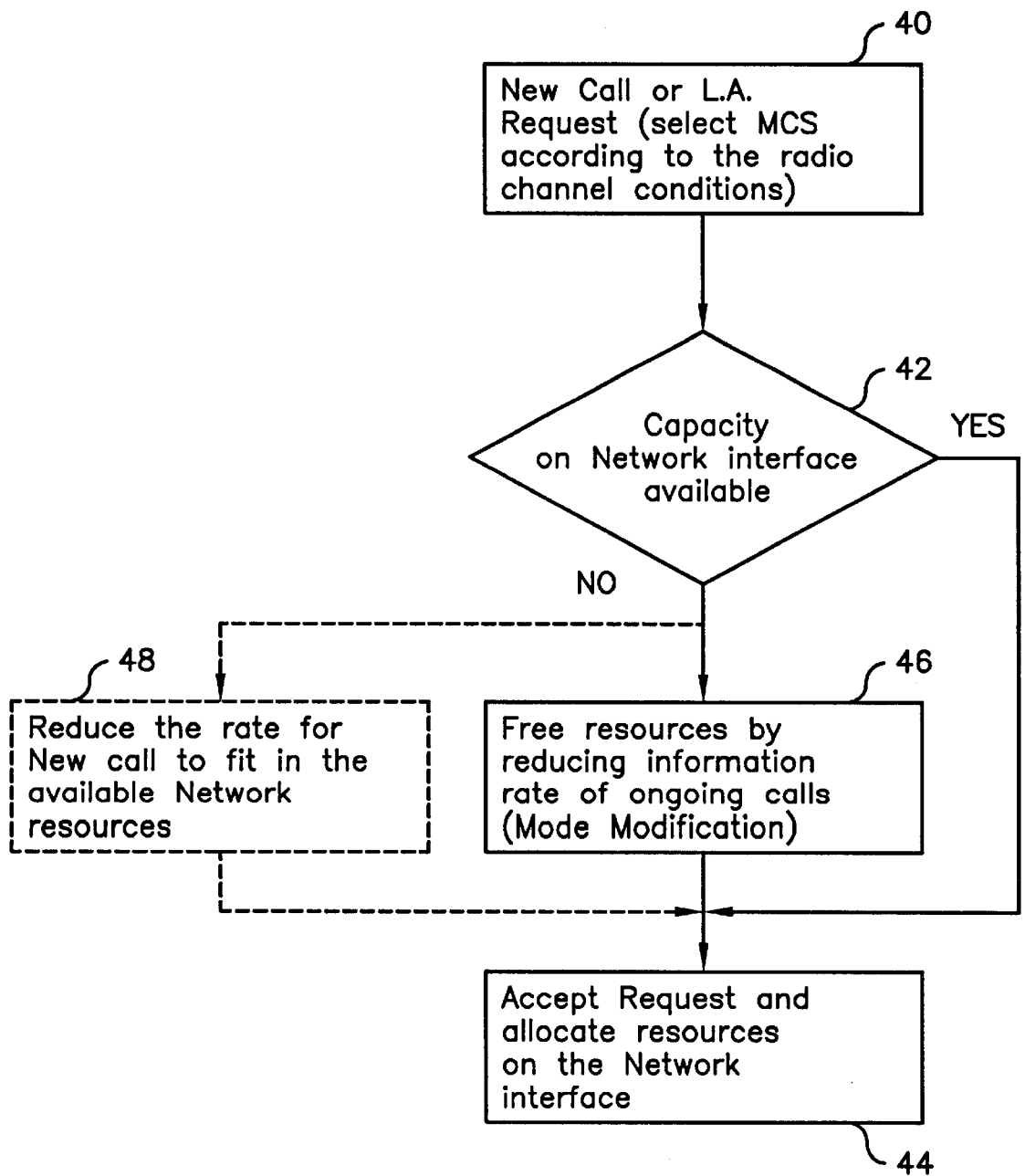
FIG. 3 is a flowchart illustrating a mode selection embodiment according to the present invention.

An example of this technique is illustrated in FIG. 3. Therein, at step 40, a new call or transmission mode request is received by the system. A transmission mode (e.g., modulation/coding scheme or MCS) is initially selected by the system based on, among other criteria, the radio channel conditions and the throughput requested for the connection. These other criteria may, for example, be dependent upon the quality of service required, e.g., frame error rate (FER) or bit error rate (BER), for new and/or existing connections in the system. However, the system also checks to see, at step 42, whether the access network has sufficient capacity to accommodate the new call. If so, then the flow proceeds to step 44, wherein the request is accepted, resources are allocated on the access network and the connection is established using the initially selected transmission mode.

Otherwise, if sufficient access network resources are not available, then the flow proceeds to step 46, wherein resources are released by reducing the information rate of ongoing calls. Alternatively, as indicated by the dotted lines, step 48 can be performed wherein the information rate of the new call is reduced to fit within the remaining capacity of the access network, i.e., by changing the initially selected transmission mode to a new transmission mode which has a lower information rate. As mentioned earlier, it is also possible for the system to monitor the capacity of the access network and adjust new or ongoing calls before the capacity of the access network is reached if desired.

Techniques which do not necessarily involve switching transmission modes on the air interface may also be considered for handling call blocking and/or delay which will occur when access network capacity is exceeded. First it is useful to consider the result if the resources of the access network are completely shared, i.e., no priority is given to any particular connection in terms of assigning access network resources thereto. Using complete sharing of the access network resources involves statistical multiplexing of lower bit rate streams with higher bit rate streams on the same access network resource. Of course, since the access network resources may be insufficient to handle a fully loaded air interface, new lower bit rate and higher bit rate stream arrivals may experience blocking and/or delay before transmission on the access network interface. Thus, the system designer and/or network operator should be aware of the relationship between the access network interface bandwidth requirements for a given blocking factor and packet delay. Applicants have performed some tests of complete sharing which confirm that this solution yields promising results when the percentage of users using higher bit rate transmission is relatively low.

Figure 4:
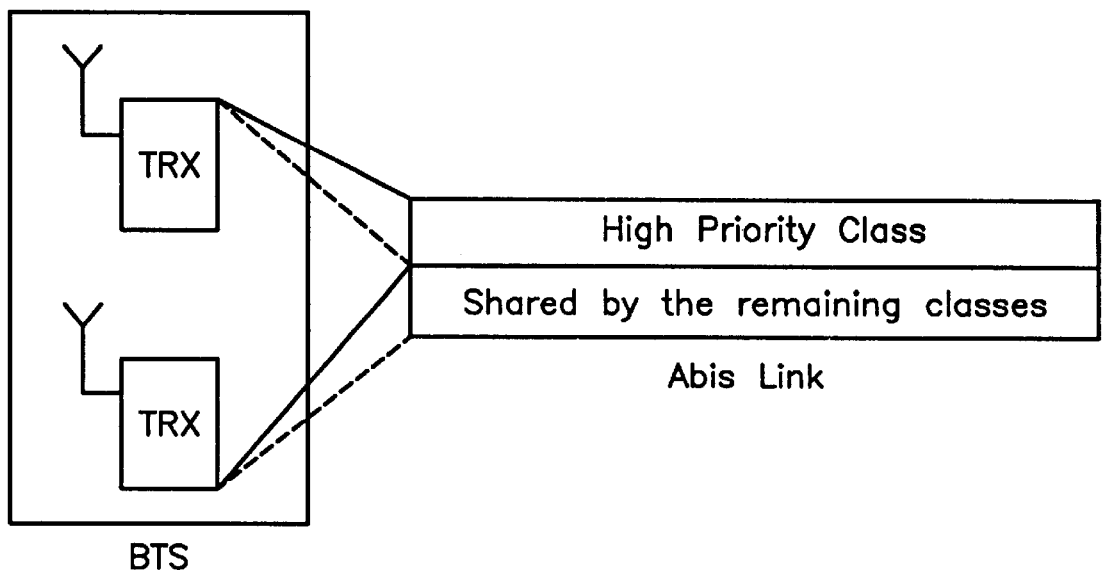
FIG. 4 depicts the concept of resource segregation of an access network interface according to exemplary embodiments of the present invention.

At other times, e.g., when higher bit rate transmissions are a relatively high percentage of the traffic load, another technique, referred to herein as resource segregation or partitioning may be used. This technique involves categorizing different types of traffic and providing a portion of the access network resource for each category of traffic. One example involves having a high priority class for which enough access network capacity is reserved that this class of traffic is never blocked and/or delayed. The remainder of the access network capacity may then be shared among the remaining classes of traffic. This concept is illustrated in FIG. 4.

Figure 5:
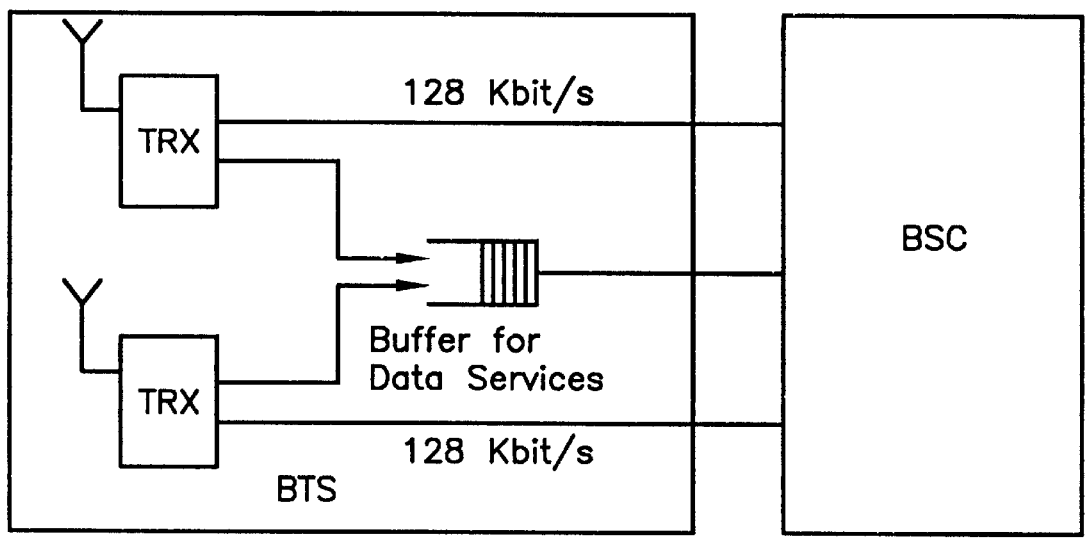
FIG. 5 illustrates resource segregation according to one exemplary embodiment wherein speech traffic has higher priority than data traffic.

A specific example of resource segregation that could be implemented involves categorizing real time communication service, e.g., speech, and packet, e.g.,data, traffic as separate classes. Speech service is highly delay/blocking sensitive and, therefore, could be accorded highest priority. Data communications, which are generally more delay tolerant, could share the remaining resources. An exemplary implementation of this type of resource segregation is shown in FIG. 5. Therein, each TRX has allocated thereto 128 kbps (2 PCM slots) of access network interface capacity which is reserved for speech traffic. This capacity is sufficient to eliminate blocking for speech traffic for an exemplary GSM system having the data rates illustrated in FIG. 1 and having eight traffic channels per frequency. The remaining access network resources are shared among the TRXs for data traffic. Thus, the data traffic may be buffered when the amount of data traffic exceeds the ability of the access network to convey data packets to the BSC.

Resource segregation provides one way in which call blocking can be proactively controlled by a system designer/network operator by allocating the finite resources of the access network interface in a controlled way. A more general solution, referred to herein as partial sharing, can also be implemented. For example, in the complete sharing solution, higher bit rate communications will generally experience higher blocking probabilities than lower bit rate communications. For a given load on the access network interface, the blocking probabilities for each type of transmission can be determined. Thus, each service class can be allocated a specific bandwidth on the access network that will provide for some maximum call blocking/delay result. Consider FIG. 6 wherein the bandwidth for an access network interface is partially shared between four services classes. The highest priority class has some reserved bandwidth that only calls in this class may use and may also use any other unused portion of the access network resource. Class 2 calls may be services using any of the available bandwidth except that reserved for class 1. Class 3 calls share bandwidth with class 1 and 2 calls and also have access to the common bandwidth. Class 4 calls may only use the common bandwidth. If the common bandwidth is fully utilized, then class 4 calls will be blocked or delayed.

Figure 6:
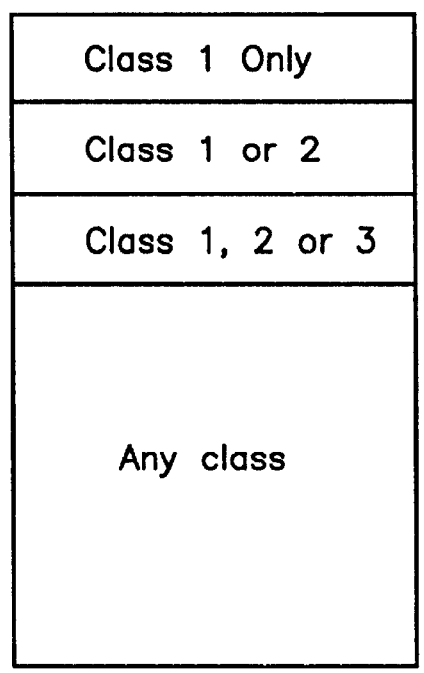
FIG. 6 illustrates bandwidth allocation for an access network according to an exemplary partial sharing embodiment of the present invention.

The partial sharing model allows system designers and/or network operators to define different quality of service(QoS) characteristics for the access network interface. Note that the percentages implied by the bar chart of FIG. 6 are merely exemplary and can be defined for a given access network load and desired QoS requirements for each service class. Moreover, it is possible that the percent bandwidth allocated to each category may be varied by the system based upon the current load of the access network. It should be noted that the foregoing embodiments associated with allocating call blocking and/or delay created by air interface information loads which exceed the capacity of a portion of the access network may be combined with the earlier embodiments treating solutions which adapted the transmission mode of the air interface in light of access network loading.

Figure 7:
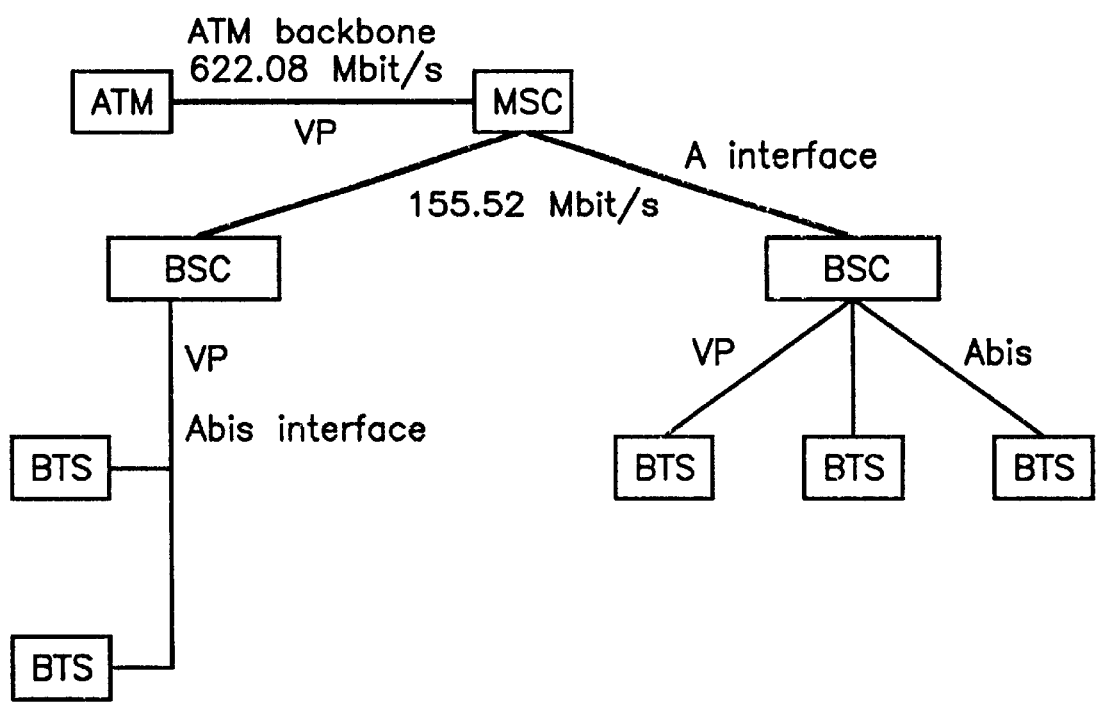
FIG. 7 depicts usage of ATM technology in radiocommunication systems according to exemplary embodiments of the present invention.

Another technique for implementing an access network involves applying asynchronous transfer mode (ATM) techniques to the access network interface (and other interfaces)

in radiocommunication systems. ATM uses virtual connections to provide information transport between nodes. These connections are deemed "virtual" since the users can connect end-to-end, but such connection is made only when a "cell" of data needs to be transmitted. The connection between two endpoints in an ATM system is called a virtual channel connection (VCC). The VCC consists of a series of virtual channel links that extend between switches. A virtual path (VP) is a phrase associated with a bundle of VC links that all have the same end points. As with VCs, virtual path links can be strung together to form a virtual path connection (VPC). A detailed discussion of ATM technology is beyond the scope of the present discussion, however the interested reader is referred to U.S. patent application Ser. No. 08/701,146, entitled "Hybrid ATM Adaptation Layer" and filed on Aug. 21, 1996, the disclosure of which is incorporated here by reference. An example of how a GSM network could be modified according to an exemplary embodiment of the present invention to use ATM interfaces in place of existing interfaces is illustrated in FIG. 7. Implementing these interfaces using ATM techniques raises the issue of how packet delay will be handled, which delay can be handled using the foregoing exemplary embodiments related to changing the air interface transmission mode and/or allocating delay to different classes of service. In ATM techniques, where information is divided into cells which are transferred over the interfaces, additional parameters like cell delay, cell loss ratio, and cell delay variation can be used to characterize communication links. Thus, the radio interface transmission mode may be selected to minimize one or more of these performance parameters.

In addition to adjusting the transmission mode of the air interface and creating techniques for allocating call blocking and/or delay as techniques for dealing with access network loading, other system processes can take into account this parameter. For example, cell selection processes can take into account access network loading. In many situations call set-up may be made to more than one base station, e.g., in a hierarchical cell environment, where both macro and microcells coexist. Under these conditions, the cell selection may select a base station, at least in part, based upon the access network loading associated with each candidate. Similar considerations can be applied to handoff processes. If a situation arises that a mobile station needs to be handed off, e.g., to improve the received signal quality, and two or more candidates exist, then the loading of the access network to each candidate can be considered as part of the decision as to which candidate will become the new serving base station. For both cell selection and handoff, the consequences to the radio network (e.g., interference) and the access network can be considered, possibly in a weighted manner, to arrive at a decision.

The foregoing exemplary embodiments have focused on the interface between the base transceiver station (BTS) and the base station controller (BSC), e.g., the A-bis interface, to provide illustrations of how loading on the access network interface can be used to adjust operation of the air interface. However, those skilled in the art will appreciate that the present invention can consider the load on any or all portions and links involved in the terrestrial portion of the radiocommunication system, e.g., the link between the BSC and the GMSC (A interface).

Although the invention has been described in detail with reference only to a few exemplary embodiments, those skilled in the art will appreciate that various modifications can be made without departing from the invention. For example, systems according to the present invention may reduce the information rate of new and/or ongoing connections when the load on the access network gets too high. However, these systems can also return some or all of the new and/or ongoing connections to higher information rates over the air interface when the load in the access network decreases. Accordingly, the invention is defined only by the following claims which are intended to embrace all equivalents thereof.

What is claimed is:

1. A method for communicating information in a radiocommunication system comprising the steps of:

having an air interface and a fixed interface:

determining a first information transmission rate for a new connection to be established over said air interface;

evaluating a remaining capacity of an access network which provides for transmission of information between two fixed nodes in said radiocommunication system via said fixed interface in said radiocommunication system;

selectively reducing a second information transmission rate associated with at least one ongoing connection to provide additional access network capacity if insufficient access network capacity is available to establish said new connection;

establishing said new connection; and transmitting said information on said new connection using said first information rate.

2. The method of claim 1, wherein said step of determining further comprises the step of:

evaluating characteristics of said air interface and determining said first information transmission rate based on said characteristics.

3. The method of claim 1, further comprising the step of:

allocating resources on said access network based, at least in part, on a service class associated with said new connection.

4. The method of claim 1, wherein said step of selectively reducing further comprises the step of:

adjusting at least one of a modulation scheme, a coding scheme, a spreading code, and a spreading factor associated with said ongoing connection.

5. The method of claim 1, further comprising the step of:

using asynchronous mode transfer techniques to convey information over said access network interface.

6. A method for communicating information in a radiocommunication system having an air interface and a fixed interface comprising the steps of:

determining an information rate for a new connection to be established over said air interface;

evaluating a remaining capacity of an access network over which information is transmitted between two fixed nodes in said radiocommunication system via said fixed interface in said radiocommunication system;

selectively reducing said information rate associated said new connection to provide additional access network capacity;

establishing said new connection; and transmitting said information on said new connection.

7. The method of claim 6, wherein said step of determining further comprises the step of:

evaluating characteristics of said air interface and determining said information transmission rate based on said characteristics.

8. The method of claim 6, farther comprising the step of:
allocating resources on said access network based, at least in part, on a service class associated with said new connection.

9. The method of claim 6, wherein said step of selectively reducing further comprises the step of:
adjusting at least one of a modulation scheme, a coding scheme, a spreading code, and a spreading factor associated with said new connection.

10. The method of claim 6, further comprising the step of:
using asynchronous mode transfer techniques to convey information over said access network interface.

11. A radiocommunication system comprising:
a base station for transmitting information to, and receiving information from, a plurality of remote units over an air interface;
a central station for transmitting information to, and receiving information from, said base station over an access network interface;
wherein a connection between said base station and a remote unit is assigned to a predetermined service class; and
wherein a bandwidth available for allocation to said connection for transmitting information associated with said connection to and from said central station over said access network interface is based upon said predetermined service class.

12. The radiocommunication system of claim 11, wherein said central station is a base station controller (BSC).

13. The radiocommunication system of claim 11, wherein an amount of bandwidth on said access network interface is assigned to each predetermined service class based upon blocking percentage.

14. The radiocommunication system of claim 11, wherein an amount of bandwidth on said access network interface is assigned to each predetermined service class based upon delay.

15. The radiocommunication system of claim 13, wherein one of said predetermined service classes is associated with speech traffic and said assigned amount of bandwidth for said one of said predetermined speech classes is sufficient to ensure a substantially zero blocking percentage.

16. The radiocommunication system of claim 11, wherein said predetermined service classes include real time communication and packet data.

17. The radiocommunication system of claim 11, further comprising:
a buffer for holding data packets which cannot currently be transmitted over said access network interface since priority bandwidth is provided to speech traffic.

18. The radiocommunication system of claim 11, wherein said access network interface uses asynchronous transfer mode data communication.

19. The radiocommunication system of claim 11, wherein at least three predetermined service classes are defined, a first service class having a first portion of said allocatable bandwidth dedicated thereto, a second service class having a second portion of said allocatable bandwidth shared between said second service class and said first service class and a third service class sharing a third portion of said allocatable bandwidth with said first and second service classes.

* * * * *